United States Patent
Hamada et al.

[15] 3,686,392
[45] Aug. 22, 1972

[54] NUTRIENT RATION FOR INCREASING GROWTH OF LIVESTOCK AND POULTRY

[72] Inventors: Yoshio Hamada, Tokyo; Motohisa Yoshino, Suita, both of Japan

[73] Assignee: Takeda Chemical Industries, Ltd., Osaka, Japan

[22] Filed: Jan. 26, 1966

[21] Appl. No.: 523,047

[30] Foreign Application Priority Data

Jan. 27, 1965 Japan .......................45/4763
Feb. 3, 1965 Japan .......................40/6096

[52] U.S. Cl. .....................424/16, 99/2 G, 424/180, 99/4
[51] Int. Cl. ................................A23k 1/00
[58] Field of Search..........99/140 N, 2, 2 G, 4, 16, 9; 195/28 N

[56] References Cited

UNITED STATES PATENTS

| | | |
|---|---|---|
| 3,168,446 | 2/1965 | Omura et al..................195/28 |
| 2,703,285 | 3/1955 | Luther...........................99/7 |
| 2,921,853 | 1/1960 | Card et al. ...............99/140 X |
| 2,932,571 | 4/1960 | Tribble et al. ...................99/2 |
| 3,104,171 | 9/1963 | Sakaguchi et al........99/140 N |
| 3,362,828 | 1/1968 | Thrasher et al..................99/2 |

FOREIGN PATENTS OR APPLICATIONS

| | | |
|---|---|---|
| 1,394,330 | 4/1965 | France............................99/2 |

OTHER PUBLICATIONS

Chem. Abstracts (I) Vol. 62 (1965) page 3323 Article date 1964
Chemical Abstracts (II) Vol. 55 (1960) page 10735.
Chemical Abstracts (III) Vol. 52 (1958) page 7481.

*Primary Examiner*—Lionel M. Shapiro
*Attorney*—Wenderoth, Lind & Ponack

[57] ABSTRACT

A method of increasing the rate of growth of livestock and poultry which comprises feeding said livestock or poultry a nutrient ration containing a small amount of 5'-nucleotide, preferably one of the 5'-monophosphates of cytidine, adenosine, quanosine or uridine or mixtures thereof. The ration can be a synthetic milk or a grain feed or forage.

10 Claims, No Drawings

NUTRIENT RATION FOR INCREASING GROWTH OF LIVESTOCK AND POULTRY

This invention relates to a feeding composition for livestock and poultry, and more particularly it relates to a feeding composition containing 5'-nucleotide such as cytidine 5'-monophosphate, adenosine 5'-monophosphate, guanosine 5'-monophosphate, uridine 5'-monophosphate or inosine 5'-monophosphate (each of these 5'-nucleotides is hereinafter referred to as "5'-CMP," "5'-AMP," "5'-GMP," "5'-UMP" or "5'-IMP" respectively) or salt thereof.

One trend in modern nutrition is toward the rapid production of marketable livestock or poultry. Another trend is toward the improvement of the feed efficiency or feed conversion from feed to weight of livestock or poultry.

It has now been discovered that the inclusion of small amounts of 5'-nucleotide in livestock or poultry feeds increases the rate of growth of the livestock or poultry and improves the feed efficiency or feed conversion from feed to weight of livestock or poultry; in most instances the desirability of the feed composition containing 5'-nucleotide increases the degree of acceptance of the feed. Further, it has been discovered that the feed composition: synthetic milk containing 5'-nucleotide, can be used as a remarkable milk replacer for suckling livestock. And it has also been discovered that these milk replacers never cause such undesirable effects as loose bowels or other diseases observed in the feeding of known milk replacers.

As 5'-nucleotide in the present invention, there may be used, for example, 5'-CMP, 5'-AMP, 5'-UMP, 5'-GMP or 5'-IMP or their alkali metal (e.g. sodium, potassium, etc.) or alkaline earth metal (e.g. calcium, etc.) salt. These compounds can be prepared by per se known methods such as enzymatic means, chemical synthesis or hydrolysis of nucleic acid which can be extracted from living tissues (e.g. microorganisms, animal tissues, etc.), and may be used independently of or combinatively with each other, or may be fed in combination with glutamic acid, sodium glutamate or others. Generally, the amount of 5'-nucleotide added will fall in the range of from 0.001 to 1 percent by weight based on the total weight of the feed composition though it may vary with the difference of the 5'-nucleotide used, the livestock and poultry fed, or the stage of feeding. The desirable amount added to a milk replacer is as follows, for example:

| 5'-nucleotide | Pig Colostrum (% by wt.) | milk (% by wt.) | Calf Colostrum (% by wt.) | milk (% by wt.) |
|---|---|---|---|---|
| 5'-AMP | 0.002–0.005 | 0.005–0.01 | 0.001–0.005 | 0 –0.004 |
| 5'-GMP | 0.01 –0.03 | 0.01 –0.03 | 0.001–0.002 | 0.001–0.002 |
| 5'-UMP | 0.05 –0.3 | 0.03 –0.3 | 0.005–0.15 | |
| 5'-CMP | | | 0.005–0.03 | 0.001–0.003 |

The feed to which the 5'-nucleotide(s) is(or are) added can be any of the feed or nutrient rations commonly fed to livestock, e.g. swine, dairy cattle, beefcattle, calf, lamb, kid, horse and dog, and to poultry, e.g. chick, layer, breeder, duck, turkey and quail.

These feeds include grain, e.g. corn, wheat, oats, and barley; grain products, e.g. corn gluten feed, wheat middlings, and wheat bran; oil by-products, e.g., soybean meal, cottonseed meal, and linseed meal; forage, both green and dry, e.g. legumes and grasses such as for instance alfalfa and clover; and by-products of sugar manufacture, molasses, beet pulp and the like. Mixtures of two or more of these feed ingredients can be present in such combinations as will fulfil the nutrient requirement of the animal. These feeds may contain other sources of protein, fat, minerals and vitamins.

The additive can be incorporated in the feeds in any convenient manner. However, as 5'-nucleotide is easily destroyed by phosphatase which is contained in most feeds, the phosphatase should be inactivated or destroyed just after or simultaneously with or before the addition of nucleotide fractions to sustain the effect of 5'-nucleotide. Though the inactivation or destruction of phosphatase may be effected by the addition of a phosphatase-inhibitor (e.g. arsenates, phosphates or cyanates), most of these are unsuitable as additive to feed for livestock or poultry, and therefore use of a phosphatase-inhibitor is desirably avoided. The inactivation is preferably effected by heating for a short time, for example at 60° C for 40 minutes, at 65° C for 20 minutes, at 70° C for 5 minutes, at 75° C for 4 seconds or at 80° C for only 1 second in the case of milk-type feed. Such a short heating does not at all affect the natural flavor or taste of the original feeds, but also there is no fear of contamination of unfavorable substance in the product.

As another method for protecting 5'-nucleotide from decomposition with phosphatase, there may be employed expedients such as coating the 5'-nucleotide with a coating agent which is soluble in water, e.g. polyvinyl alcohol and polyethylene glycol, or another kind of coating agent which is not decomposed in the presence of water at room temperature but is decomposed at an elevated temperature. As the latter coating agent there may, for example, be employed wax (e.g. ozokerite, ceresin, utah wax or montan wax, paraffin wax, petrolatum wax, carnauba wax, Japan wax, bayberry wax, flax wax, spermaceti, beeswax, chinese wax, shellac wax, etc.), an ester of a fatty acid having from 12 to 31 carbon atoms and a fatty alcohol having from 12 to 31 carbon atoms (e.g. myricyl palmitate, cetyl palmitate, cyricyl cerotate, cetyl myristate, ceryl palmitate, ceryl cerotate, cyricyl melissate, stearyl palmitate, stearyl myristate, lauryl laurate, etc.), fatty acids having from 10 to 22 carbon atoms (e.g. decenoic, docosanoic, stearic, palmitic, lauric, myristic acid, etc.), fatty alcohols having from 14 to 31 carbon atoms (e.g. lauryl, cetyl, stearyl, myristyl, myricyl, arachyl, carnaubyl, ceryl alcohol, etc.), the mono-, di-or triglyceryl esters formed from fatty acids having from 10 to 22 carbon atoms and the like.

The following examples further illustrate the invention but it is not intended that they limit the invention to the procedures, amount of active ingredient or described rations; but rather it is intended that all equivalents obvious to those skilled in the art be included within the scope of the invention. In this specification and claims, percentages are all on the weight basis, and in the examples, "kg," "g," "mg," "IU, " "5'-UMP-Na," "5'-CMP-Na", "5'-AMP-Na," "5'-IMP-Na" and "5'-GMP-Na" stand for "kilogram," "gram," "milligram," "International Units," "disodium salt of 5'-UMP," "disodium salt of 5'-CMP, " "disodium salt of 5'-AMP," "disodium salt of 5'-IMP" and "disodium salt of 5'-GMP," respectively, and temperatures are all uncorrected.

TEST 1

Test animal:
  One-litter size (8 heads) of Central Yorkshire pigs, which were divided equally in number into two groups and tested.
Test period:
  From 60 day-old (at weaning) to 180 day-old.
Feed used:
  Control group: Commercial concentration.
  Test group: Commercial concentration 99.99 parts. A mixture of 5'-IMP-Na and 5'-GMP-Na (1:1) 0.01 parts.

Composition of Commercial Concentration:

| | |
|---|---|
| forage | 27% |
| rice bran | 10% |
| corn | 28% |
| barley | 15% |
| alfalfa meal | 5% |
| soy bean meal | 7% |
| fish meal | 5% |
| calcium carbonate | 1.5% |
| sodium chloride | 0.5% |
| mineral mixture* | 0.1% |
| vitamin mixture** | 0.15% |
| antibiotic feed supplement*** | 0.05% |
| calcium secondary phosphate | 0.5% |

* mineral mixture contains:

| | |
|---|---|
| manganese | 24% |
| zinc | 18% |
| iron | 8% |
| copper | 1% |
| iodine | 0.5% |
| cobalt | 0.2% |

** vitamin mixture contains:

| | |
|---|---|
| vitamin A | 800,000 IU |
| vitamin D | 200,000 IU |
| vitamin E | 400 IU |
| vitamin $B_{12}$ | 1.6 mg |
| riboflavin | 800 mg |
| niacin | 5,000 mg |
| d-pantothenic acid | 1,000 mg |
| choline chloride | 70,000 mg |
| menadione | 264 mg |
| dl-methionine | 68 mg |
| folic acid | 60 mg |
| 1,2-dihydro-6-ethoxy-2,2,4-trimethyl-quinoline | 1.4 mg |

*** Commercially available as Aurofac-10 (American Cyanamid Co.) which is a feed supplement or premix containing, per pound of premix, 10.0 grams of Aureomycin and chlortetracycline hydrochloride.

Result:
(1) Weight gain
  Average body weight per pig(kg)

| group | age of pigs 60 day-old (at starting) | 90 day-old | 120 day-old |
|---|---|---|---|
| Control | 14.20 | 28.64 | 47.11 |
| Test | 13.94 | 29.96 | 52.31 |

| | 150 day-old | 180 day-old |
|---|---|---|
| Control | 66.20 | 81.00 |
| Test | 76.24 | 95.48 |

(2) Average gain(kg)

| group | age of pigs 60–90 day-old | 90–120 day-old | 120–150 day-old | 150–180 day-old |
|---|---|---|---|---|
| Control | 14.44 | 18.47 | 19.19 | 14.80 |
| Test | 16.02 | 22.55 | 23.93 | 18.20 |

(3) Average feed consumed(kg)

| group | age of pigs 60–90 day-old | 90–120 day-old | 120–150 day-old | 150–180 day-old |
|---|---|---|---|---|
| Control | 48.37 | 59.47 | 82.09 | 80.36 |
| Test | 50.46 | 69.96 | 93.81 | 88.46 |

(4) Feed conversion

| group | age of pigs 60–90 day-old | 90–120 day-old | 120–150 day-old | 150–180 day-old |
|---|---|---|---|---|
| Control | 3.35 | 3.22 | 4.30 | 5.43 |
| Test | 3.15 | 3.13 | 3.90 | 4.85 |

5. Others
  The pigs of the control group had loose bowels after several days from the start of test, while in the test group no such symptom was found.

TEST 2

Test animal:
  6 suckling Yorkshire pigs, which were divided equally in number into two groups and tested.
Test period:
  From 5 day-old to 60 day-old.
Feed used:

| group | period 5–19 day-old | 20–26 day-old | 27–60 day-old |
|---|---|---|---|
| Control | colostrum milk A | milk A | milk B |
| Test | colostrum milk A | milk A' | milk B' |

| | milk A(%) | milk B(%) |
|---|---|---|
| wheat flour | 55.8 | 25.97 |
| soybean powder (treated at 120°C) | 20 | 0 |
| yellow corn | 0 | 35 |

| | milk A(%) | milk B(%) |
|---|---|---|
| soybean powder (raw) | 0 | 15 |
| fish meal | 8.44 | 6.3 |
| forage | 0 | 3.5 |
| molasses | 13.3 | 12 |
| calcium carbonate | 1.25 | 1.2 |
| calcium secondary phosphate | 0.2 | 0.2 |
| mineral mixture * | 0.05 | 0.05 |
| sodium chloride | 0.5 | 0.5 |
| Aurofac-10 *** | 0.2 | 0.12 |
| vitamin mixture ** | 0.16 | 0.16 |
| protease | 0.1 | 0 |

*, , * each is the same as in Test 1.

milk A:

Commercial synthetic milk containing higher than 25 percent of crude protein, higher than 5 percent of crude fat, higher than 3 percent of crude fiber and higher than 7 percent of crude ash.

milk B:
Commercial synthetic milk containing higher than 21 percent of crude protein, higher than 3 percent of crude fat, higher than 3 percent of crude fiber and higher than 7 percent of crude ash.

milk A':
Synthetic milk consisting of 99.99 percent of milk A and 0.01 percent of an equivalent mixture of 5'-IMP-Na, 5'-GMP-Na, 5'-CMP-Na and 5'-UMP-Na.

milk B':
Synthetic milk consisting of 99.99 percent of milk B and 0.01 percent of an equivalent mixture of 5'-IMP-Na, 5'-GMP-Na and 5'-CMP-Na and 5'-UMP-Na.

Result:
(1) Average body weight per pig(kg)

| group | 5 day-old | 20 day-old | 60 day-old |
|---|---|---|---|
| Control | 1.63 | 2.52 | 8.1 |
| Test | 1.62 | 2.83 | 60.7 |

(2) Weight gain (5–60 days)

| group | average gain per pig(kg) | average synthetic milk consumed(kg) | average feed conversion |
|---|---|---|---|
| Control | 6.46 | 13.24 | 2.05 |
| Test | 9.08 | 15.61 | 1.73 |

TEST 3

Test animal:
9 suckling Central Yorkshire pigs, which were divided equally in number into three groups and tested.

Test period:
From 22 day-old to 60 day-old pigs.

Feed used:

| group | 1–2 days | 3–10 days | 11–22 days | 23–26 days | 27–60 days |
|---|---|---|---|---|---|
| Control 1 | colostrum | colostrum + milk A | milk A | milk A | milk B |
| Control 2 | colostrum | colostrum + milk A | milk A + cow's milk | milk A | milk B |
| Test | colostrum | colostrum + milk A' | milk A' | milk A' | milk B' | milk A, A', B and B' are the same as in Test 2.

Result:

| | Control 1 | Control 2 | Test |
|---|---|---|---|
| Average initial weight(kg) | 1.47 | 1.35 | 1.35 |
| Average weight at 22 day-old(kg) | 3.8 | 4.2 | 4.8 |
| Average final weight(kg) | 13.1 | 14.4 | 16.7 |
| Average gain per pig in the period of 22–60 day-old(kg) | 9.3 | 10.2 | 11.9 |
| Average Feed conversion | 1.99 | 1.83 | 1.81 |

TEST 4

Test animal:
10 calves, which were divided equally in number, into two groups and tested.

Test period:
From 2 to 22 week-old calves.

Feed used:

| age of calves | milk replacer | Test (g/calf/day) calf-starter | starter | roughage (hay) | Control |
|---|---|---|---|---|---|
| 1–4 day-old | ( | colostrum | ) | | |
| 5–7 " | 500 | | | | |
| 8–10 " | 750 | a little | | a little | |
| 11–20 " | 1000 | a little | | a little | Total mother's milk 280kg/calf |
| 21–30 " | 1000 | 200 | | 200 | defat milk 600kg/calf |
| 31–35 " | 750 | 600 | | 300 | |
| 36–40 " | 500 | 1000 | | 400 | starter 124kg/calf |
| 41–45 " | 250 | 1300 | | 500 | |
| 46–55 " | | 1500 | | 700 | |
| 56–80 " | | 1700 | | 1000 | |
| 81–100 " | | 2000 | | 1500 | |
| 101–110" | | 1000 | 1000 | 2000 | |
| 111–150" | | | 2000 | 2500 | |
| Total (kg/calf) | 31 | 124 | 90 | | |
| After 150 day-old | starter 2000g/calf/ | day + hay 3000g/calf/day. | | | | milk replacer:
| | |
|---|---|
| defat milk | 70% |
| whey | 5% |
| 5'-nucleotide mixtures* | 10% |
| glucose | 6.5% |
| lard | 5% |
| mineral mixtures** | 0.5% |
| vitamin mixtures*** | 3% |
| TDN (Total Digestible Nutrions) | 88.15% |
| CP (Crude Protein) | 27.25% |
| DCP (Digestible Crude Protein) | 25.65% | calf-starter:
| | |
|---|---|
| soybean oil meal | 15% |
| linseed meal | 10% |
| corn | 20% |
| oats | 20% |
| forage | 20% |
| 5'-nucleotide mixtures* | 10% |
| molasses | 2% |
| mineral mixtures** | 0.5% |
| vitamin mixtures*** | 2.5% |
| TDN | 69.18% |
| CP | 20.54% |
| DCP | 17.46% |

*5'-nucleotide mixtures contains 0.15% of 5'-CMP-Na, 0.03% of 5'-AMP-Na, 0.26% of 5'-UMP-Na, 0.05% of 5'-IMP-Na, and 0.09% of 5'-GMP-Na.

**mineral mixtures contains 24% of manganese, 18% of zinc, 8% of iron, 1% of copper, 0.5% of iodine and 0.2% of cobalt in available form.

***vitamin mixtures contains 800,000 IU of vitamin A, 200,000 IU of vitamin $D_3$, 400 IU of vitamin E, 1.6 mg of vitamin $B_{12}$, 800 mg of riboflavin, 5 g of niacin, 1.6 g of pantothenic acid, 70 g of choline chloride, 260 mg of menadione, 70 mg of dl-methionine, 60 mg of folic acid, 11 mg of 1,2-dihydro-6-ethoxy-2,2,4-trimethyl-quinoline and 1 g of anti-biotic agent in 5 g of said mixtures.

Starter: Commercial cattle supplement.

Result:
Average body weight per/calf(kg)

| group | age of calf 16 week-old | 22 week-old |
|---|---|---|

|         |     |     |
|---------|-----|-----|
| Control | 113 | 125 |
| Test    | 123 | 147 |

TEST 5

Test animal:
  Hiiku No. 1 (chicken for broiler)
Test period:
  From 1 to 60 day-old.
Number of one group:
  female 30
  male 30
Feed used:

| Group | Feed used |
|-------|-----------|
| 1 | basal diet 99.95% + 5'-IMP-Na 0.05% |
| 2 | "                + 5'-GMP-Na    " |
| 3 | "                + 5'-AMP-Na    " |
| Control | " |

Composition of basal diet

| | |
|---|---|
| yellow corn | 45% |
| rice bran | 4% |
| forage | 4% |
| soybean meal | 9% |
| fish meal | 6% |
| fish soluble | 3% |
| alfalfa meal | 2% |
| calcium carbonate | 5% |
| calcium tertiary phosphate | 0.4% |
| sodium chloride | 0.35% |
| vitamin mixture ** | 0.1% |
| mineral mixture * | 0.05% |
| Furazolidone | 0.01% |

*,**: each is the same as in Test 1.

Result:

| group | No. of chickens | initial average wt. per chicken (g) | No. of chickens | average weight per chicken (g) | final average feed consumed (g) | average feed conversion |
|---|---|---|---|---|---|---|
| 1 | 60 | 74 | 59 | 1,305 | 3,898 | 3.1 |
| 2 | 60 | 75 | 58 | 1,272 | 3,738 | 3.1 |
| 3 | 60 | 74 | 59 | 1,340 | 3,888 | 3.0 |
| Control | 60 | 75 | 55 | 1,317 | 4,183 | 3.3 |

TEST 6

Test animal:
  White leghorn (chicken breeder)
Test period:
  From 1 to 30 day-old chicken
Number of one group:
  male 25
Feed used:

| group | Feed used |
|-------|-----------|
| Control | basal diet* |
| 1 | "        99.5% + 5'-nucleotide mixtures** 0.5% |
| 2 | "        99%   + 5'-nucleotide mixture**  1% |

*the same as in Test 5.
**5'-nucleotide mixtures containing 0.15% of 5'-CMP-Na, 0.03% of 5'-AMP-Na, 0.26% of 5'-UMP-Na, 0.05% of 5'-IMP-Na and 0.09% of 5'-GMP-Na.

Result:

| age | group | control | 1 | 2 |
|---|---|---|---|---|
| initial | average weight per chicken(g) | 33 | 33 | 33 |
| 10-day-old | average weight per chicken(g) | 100 | 98 | 95 |
|  | Total feed used per chicken(g) | 188 | 120 | 114 |
|  | average feed conversion | 2.8 | 1.7 | 1.7 |
| 20 day-old | average weight per chicken(g) | 216 | 208 | 208 |
|  | total feed used per chicken(g) | 560 | 440 | 440 |
|  | average feed conversion | 3.0 | 2.5 | 2.5 |
| 30 day-old | average weight per chicken(g) | 364 | 356 | 352 |
|  | total feed used per chicken(g) | 1100 | 800 | 860 |
|  | average feed conversion | 3.3 | 2.7 | 2.6 |
| 40 day-old | average weight per chicken(g) | 548 | 540 | 520 |
|  | total feed used per chicken(g) | 1740 | 1430 | 1439 |
|  | average feed conversion | 3.3 | 2.8 | 2.9 |

Following are illustrative examples of presently-preferred compositions according to the invention. It will be understood that the compositions proper are widely variable. Any conventional livestock or poultry feed, especially those recommended by the American Nutrition Research Council, may be employed as basal diet to be improved according to and for the purposes of the present invention.

Example 1

Chick pre-starter composition

| Ingredients: | g |
|---|---|
| Corn | 1000 |
| Soybean oil meal 44% | 600 |
| Alfalfa meal | 20 |
| Fish meal (60%) | 100 |
| Meat and bone scraps (50%) | 50 |
| Condensed fish solubles | 60 |
| Dried whey | 50 |
| Distillers dried solubles | 50 |
| Phosphate* | 20 |
| Ground oyster shell or limestone | 30 |
| Salt | 10 |
| Manganese sulfate | 0.5 |
| Poultry feed flavor** | 1 |
| 5'-UMP-Na | 0.1 |
| 5'-IMP-Na | 0.1 |
| 5'-CMP-Na | 0.1 |
| 5'-GMP-Na | 0.1 |
| 5'-AMP-Na | 0.1 |

*Phosphate containing from 26 to 32% calcium and 18% phosphorus.
**Any conventional poultry feed flavor (e.g., Peckmor, sold by Flavor Corporation of America).

Example 2

Chick starter composition

| Ingredients: | g |
|---|---|
| Wheat | 600 |
| Corn | 600 |
| Soybean oil meal (44%) | 560 |
| Alfalfa meal | 60 |
| Dried whey | 50 |
| Fish meal (60%) | 50 |
| Phosphate* | 30 |
| Salt | 10 |
| Manganese sulfate | 0.5 |
| Poultry feed flavor** | 0.5 |

| | |
|---|---|
| 5'-IMP-Na | 0.1 |
| 5'-GMP-Na | 0.1 |

*,**the same as in Example 1

Example 3

Broiler starter composition
Ingredients:

| | g |
|---|---|
| Corn | 1050 |
| Soybean oil meal (50%) | 625 |
| Alfalfa meal | 50 |
| Poultry by-product meal | 50 |
| Dried whey | 50 |
| Fat | 90 |
| Phosphate* | 30 |
| Ground oyster shell or limestone | 35 |
| Manganese sulfate | 0.5 |
| Poultry feed flavor** | 0.5 |
| 5'-IMP-Na | 0.1 |
| 5'-GMP-Na | 0.1 |

*,**the same as in Example 1

Example 4

Broiler finisher composition
Ingredients:

| | g |
|---|---|
| Corn | 700 |
| Wheat | 600 |
| Soybean oil meal (50%) | 320 |
| Poultry by-product meal | 100 |
| Distillers dried solubles | 50 |
| Condensed fish solubles | 50 |
| Alfalfa meal | 60 |
| Fat | 50 |
| Phosphate* | 30 |
| Ground oyster shell or limestone | 30 |
| Salt | 10 |
| Manganese sulfate | 0.5 |
| Poultry feed flavor** | 0.5 |
| 5'-IMP-Na | 0.1 |
| 5'-GMP-Na | 0.1 |

*,**the same as in Example 1

Example 5

Pig Milk Replacer Compositions

| Ingredients | Starter (g) | Pre-starter (g) |
|---|---|---|
| Corn powder | 30 | 30 |
| Wheat powder | 28 | 23 |
| Soybean powder (treated at 120°C) | 25 | 20 |
| Fish meal | 8 | 5 |
| Molasses | 4.5 | |
| 5'-nucleotide mixtures* | 0.5 | 0.5 |
| NaCl | 0.3 | 0.3 |
| Precipitated Calcium carbonate | 0.4 | 0.45 |
| Calcium secondary phosphate | 0.6 | 0.7 |
| Aurofac-10** | 0.2 | 0.3 |
| Pepsin | 0.1 | 0.1 |
| Spice for pig | 0.05 | 0.05 |
| Vitamin B$_{12}$(2.2%) | 0.05 | 0.1 |
| Sodium cyclohexylsulfamate | 0.09 | 0.1 |
| Non-fat milk powder | | 25 |
| Sugar | | 7 |

*5'-nucleotide mixtures containing 0.15% of 5'-CMP-Na, 0.03% of 5'-AMP-Na, 0.26% of 5'-UMP-Na, 0.05% of 5'-IMP-Na and 0.09% of 5'-GMP-Na.
**(see Note under Test 1, supra)

Example 6

Pig pre-starter composition
Ingredients:

| | g |
|---|---|
| Ground yellow corn | 435 |
| Sucrose | 200 |
| Dried skim milk | 600 |
| Fish meal (60%) | 100 |
| Soybean oil meal (44%) | 400 |
| Dried whey | 100 |
| Condensed fish solubles | 40 |
| Fat | 80 |
| Phosphate* | 15 |
| Ground oyster shell or limestone | 10 |
| Salt, iodized | 10 |
| Manganese sulfate | 0.25 |
| 5'-CMP-Na | 0.1 |
| 5'-UMP-Na | 0.1 |
| Sodium glutamate | 1 |

*the same as in Example 1

Example 7

Sow feed composition
Ingredients:

| | g |
|---|---|
| Corn | 1340 |
| Wheat middlings | 300 |
| Soybean oil meal (44%) | 200 |
| Tankage | 60 |
| Alfalfa meal | 60 |
| Phosphate* | 10 |
| Ground oyster shell or limestone | 20 |
| Salt | 10 |
| Manganese sulfate | 0.25 |
| 5'-IMP-Na | 0.05 |
| 5'-GMP-Na | 0.05 |
| 5'-CMP-Na | 0.05 |
| Sodium glutamate | 0.5 |

*the same as in Example 1

Example 8

Calf starter compositions
Ingredients:

| | g |
|---|---|
| Corn | 560 |
| Wheat middlings | 400 |
| Soybean oil meal (44%) | 400 |
| Linseed meal | 300 |
| Distillers dried solubles | 50 |
| Alfalfa meal | 100 |
| Condensed fish solubles | 50 |
| Molasses | 100 |
| Ground oyster shell or limestone | 30 |
| Salt | 10 |
| Manganese sulfate | 0.25 |
| Sodium glutamate | 0.5 |
| 5'-nucleotide mixtures* | 3 |

*the same as in Example 5

Example 9

Horse and mule feed composition
Ingredients:

| | g |
|---|---|
| Corn (Cracked) | 700 |
| Oats (Crimped) | 800 |
| Linseed meal | 100 |
| Alfalfa meal | 100 |
| Wheat bran | 200 |
| Molasses | 100 |
| Manganese sulfate | 0.25 |
| 5'-nucleotide mixtures* | 3 |
| Sodium glutamate | 1 |

Example 10

Duck grower composition

| Ingredients: | g |
|---|---|
| Corn | 500 |
| Wheat | 764 |
| Soybean oil meal (44%) | 60 |
| Alfalfa meal | 50 |
| Wheat middlings | 200 |
| Fish meal (60%) | 50 |
| Meat and bone scraps (50%) | 100 |
| Oats, pulverized | 10 |
| Delactosed whey | 10 |
| Ground oyster shell or limestone | 40 |
| Salt | 5.5 |
| Manganese sulfate shell or limestone | 0.5 |
| 5'-nucleotide mixtures* | 5 |
| Sodium glutamate | 2 |

*the same as in Example 1

What is claimed is:

1. A method of increasing the rate of growth of livestock and poultry which comprises feeding said livestock or poultry a nutrient ration containing 0.001 to 1 percent by weight of 5'-nucleotide.

2. A method as claimed in claim 1, wherein the 5'-nucleotide is selected from the group consisting of cytidine 5'-monophosphate, adenosine 5'-monophosphate, guanosine 5'-monophosphate, uridine 5'-monophosphate and alkali metal salts and alkaline earth metal salts thereof.

3. A process as claimed in claim 1, wherein the livestock is suckling livestock.

4. A process as claimed in claim 2, wherein the livestock is suckling livestock.

5. A process as claimed in claim 1, wherein the 5'-nucleotide is guanosine 5'-monophosphate.

6. A process as claimed in claim 1, wherein the 5'-nucleotide is inosine 5'-monophosphate.

7. A process as claimed in claim 1, wherein the 5'-nucleotide is alkaline salt of guanosine 5'-monophosphate.

8. A process as claimed in claim 1, wherein the 5'-nucleotide is alkaline salt of inosine 5'-monophosphate.

9. The method of claim 1 wherein the bulk of the nutrient ration is grain.

10. A solid feed composition for livestock and poultry comprising 0.001 to 1 percent of 5'-nucleotide by weight, the bulk thereof being grain, wherein the nucleotide is coated with a coating protecting it from decomposition by phosphotase.

* * * * *